United States Patent Office 3,480,662
Patented Nov. 25, 1969

3,480,662
OLEFIN ACTIVATOR FOR LIGANDS IN
CUPROUS HALIDE SLURRY
Jesse M. Carr, Jr., Baton Rouge, Gerald A. Byars, Denham Springs, and Richard J. De Feo, Baton Rouge, La., assignors to Esso Research and Engineering Company, a corporation of Delaware
No Drawing. Filed Sept. 19, 1966, Ser. No. 580,172
Int. Cl. C07c 121/32, 7/16, 11/24
U.S. Cl. 260—465.9                        16 Claims

ABSTRACT OF THE DISCLOSURE

A process for the recovery of complexible ligands using active cuprous chloride sorbent particles of molar ratios of copper:complexing ligand of greater than 1:1 wherein the sorbent particles are slurried in a hydrocarbon organic liquid diluent essentially inert to reaction with cuprous chloride and, as well, the additional presence of a $C_5^+$ monoolefin activator to effect liquid phase slurry complexing. Sorption is followed by desorption, while the sorbent particles are slurried in said diluent, in the presence of, or without the presence of, the said $C_5^+$ monoolefin, to recover said ligand. The presence of the $C_5^+$ monoolefin increases sorption and desorption rate without adverse effect on product quality.

CROSS REFERENCE TO RELATED APPLICATIONS

On same date with present application were filed three other applications on slurry processes employing the porous cuprous halide particles: Fasce Ser. No. 580,-173, now Patent 3,410,924; De Feo et al. application Ser. No. 580,436, now Patent 3,412,172; and Cahn et al. Ser. No. 580,190.

The present invention is directed to an improved process for recovering a complexible ligand(s) capable of forming a stable complex with a cuprous halide having a mol ratio of copper to complexing ligand of greater than 1:1 in enhanced purity from essentially anhydrous feeds containing them in lesser concentrations and lower purity by contacting said feeds with an essentially anhydrous slurry of solid, sorption-active, highly porous cuprous halide sorbent particles selected from the group consisting of cuprous chloride, cuprous bromide, and cuprous iodide in an essentially anhydrous organic liquid diluent boiling higher than said ligand(s) (and preferably also than other feed components) and containing a $C_5^+$ monoolefin which is less preferentially complexible than said ligand(s) to complex said cuprous halide with said ligand(s), and desorbing said complex in the presence of organic liquid diluent to recover said ligand(s).

More specifically, the present invention is directed to a process and composition for recovering a complexible ligand in enhanced purity from an essentially anhydrous feed containing it in lower purity wherein said ligand is capable of forming a stable complex with said cuprous halide sorbents having a mol ratio of copper to complexing ligand of greater than 1:1 which comprises: (A) contacting said feed with an essentially anhydrous slurry of (1) solid, sorption-active cuprous halide sorbent particles selected from the group consisting of cuprous chloride, cuprous bromide, and cuprous iodide and having a porosity above about 10% (of the volume of a particle) 550 to 10,000 A. pores in (2) an essentially anhydrous organic liquid diluent having a boiling point above the boiling point of said complexible ligand and containing a $C_5^+$ monoolefin which is less preferentially complexible than said ligand to be recovered at temperature and pressure conditions sufficient to effect liquid phase formation of a solid, insoluble cuprous halide-ligand complex, and (3) desorbing said solid complex in the presence of organic olefin-containing liquid diluent to recover said ligand. Usually the desorption is conducted by heating the complex in the presence of the $C_5^+$ monoolefin-containing organic liquid diluent to thermally dissociate the complex ligand therefrom.

According to one of the preferred embodiments of this invention, the liquid phase slurry complexation is conducted in a plurality of slurry-contacting steps sequentially performed with each succeeding liquid phase complexing step being conducted at a lower temperature than the preceding one and with all of said complexing steps being conducted in the presence of said $C_5^+$ monoolefin-containing organic liquid diluent.

Certain prior art ligand separation processes for selectively removing complexible ligands from feed streams containing them are based on vapor phase selective complexing of the ligands to be removed followed by vapor phase decomplexing thereof to recoup the desired ligand. Although some of these processes employ cuprous halide sorbents having high activity for sorption, these prior art procedures often require at least several complexation stages to be performed with each complexing stage being conducted in a separate fixed or fluidized complexing bed in the vapor phase due to the highly exothermic nature of the complexation reaction, and the comparatively slow vapor phase reaction rate involved. In turn, each complexing bed must be internally cooled using a large number of cooling tubes internally disposed within each complexing bed to remove the heat of reaction. These tubes, of course, periodically require maintenance, cleaning, etc., to prevent complex bed reactor fouling. Moreover, such prior art procedures require a large inventory of cuprous halide sorbent compared to the process of this invention, since each vapor phase complexing bed must contain sufficient sorbent to insure the attainment of quantitative recovery goals.

Moreover, it has been noted in conjunction with vapor phase sorption procedures that the cuprous halide sorbents are subjected to fairly rapid loss of sorptive capacity and activity. Consequently, the once sorption-active cuprous halide sorbents must be reactivated on a fairly continual basis, which increases the cost of conducting vapor phase fixed or fluidized bed ligand recovery procedures. Thus, the conventional prior art vapor phase processes are very expensive, due to the abovementioned necessities of regenerating the capacity of the sorbent, maintaining conventional internal refrigeration, and maintaining a large inventory of cuprous halide sorbent particles throughout the processing. These increased maintenance, apparatus, refrigeration and inventory costs detract significantly from the economic incentive of high purity ligand recovered.

Certain other prior art ligand separation processes for recovering ligands from feed streams containing them in comparatively dilute amounts are based on liquid phase injection of the feed into a fluidized bed or transfer line of cuprous halide sorbent particles followed by vapor phase decomplexing and drying of the sorbent particles. These processes ordinarily suffer from packing (agglomeration) of the sorbent particles to such an extent that cement mixer type apparatus, scrapers, etc., are frequently required to retain the fairly close particle size control required for effective operations both in the complexing and decomplexing stages thereof. If such precautions are not observed, the agglomeration occurring in such procedures in turn results in much reduced activity of the sorbent particles. Also, of course, the advisable complete separation of the uncomplexed material from the complexed cuprous halide sorbents (so as to obtain a more pure product ligand) is extremely difficult when the sorbent agglomerates. In such procedures, while the complexing is done in the liquid phase, the decomplexing (and any additional operation such as intermediate stripping) are usually accomplished in the gaseous phase, and the cuprous halide sorbent particles must be deliquefied and thoroughly dried (to insure adequate regeneration of the sorbent activity) prior to reuse to accomplish further ligand recovery.

Slurry ligand recovery procedures have been tried in the prior art but these procedures largely involve aqueous slurries or slurries using raw cuprous halide salts to recover monoolefinic ligands. These prior art procedures suffer from several drawbacks which detract from widespread acceptance thereof. The chief drawbacks of aqueous slurry-based recovery procedures reside in the corrosion caused by the water on complexing, stripping and decomplexing vessels, disproportionation of the cuprous ion to copper and cupric ion, agglomeration of the sorbent and the degradation of the sorbents by side reactions such as hydration, hydroxyl formation and oxidation, in addition to more expensive refrigeration costs. The procedures utilizing raw (comparatively sorption-inactive) salts to recover monoolefinic ligands, e.g., ethylene, propylene and butylenes, suffer from very low recoveries and only slight or commercially unacceptable improvement in purity of the recovered ligands (versus their purity in the feed-streams). Consequently, raw salt requirements are unusually high and inventory and equipment costs (due to the large volume of salt required plus recycle and pumping facilities) for all practical purposes in the past have ruled out such procedures for use in commercial recovery applications.

The present invention, on the other hand, overcomes most, if not all, of the drawbacks present in the above-mentioned prior are recovery procedures. Thus, the present invention achieves high recoveries of product ligand in very good purity, exhibits little or no corrosion problems, evidences little or no debilitating agglomeration, does not require close control of sorbent particle size, significantly reduces refrigeration requirements, sorbent inventory requirements, regeneration requirements, system maintenance and does not require either deliquefication or drying of the sorbent particles at any stage of processing.

Moreover, the present invention increases complexation rate and decomplexation rate without detracting from product purity. This allows more throughput and lessens apparatus costs. The reason(s) for the enhancement in complexation and decomplexation rate are not completely understood. However, it can be theorized plausibly that the presence of the $C_5^+$ monoolefin increases the accessibility of all parts (including the interior) of the cuprous chloride sorbent particles to the complexing ligand without dissolving the entire particle which would cause extinction of the porosity.

Some experimental runs indicate that in certain cases, e.g., when recovering diolefins such as 1,3-butadiene, it is advisable to complex in the presence of the $C_5^+$ monoolefins and decomplex essentially in their absence (but while keeping the sorbent solids wet with an inert organic diluent boiling higher than both the ligand being recovered and the $C_5^+$ extraneous slurry diluent). Suitable inert organic diluents which can be used are the higher boiling paraffins, e.g., $C_5$ to $C_{20}$ paraffins and $C_6$ to $C_{18}$ aromatics, e.g., $C_6$ to $C_{12}$ monocyclic aromatics containing up to six alkyl substituent carbon atoms. The stripped $C_5^+$ monoolefin is then reintroduced to the desorbed slurry (solids in inert paraffin or aromatics) prior to recycle thereof for further complexing. The reason for this stripping of $C_5^+$ monoolefin before desorption of the cuprous halide solids resides in the apparent solvation of some surface porosity when desorption is accomplished in the presence of significant amounts of these monoolefins. This solvation does not detract from sorbent capacity or activity but it can require a short induction period on recycle complexations.

In any event, the sorption-active cuprous halide particles are kept in contact with a higher boiling organic liquid diluent material throughout the entire procedure which involves in essence complexing (sorption) in the presence of extraneous $C_5^+$ monoolefins and decomplexing (desorption) with or without intermediate stripping operations, if desired.

Moreover, the use of nearly ambient temperatures throughout complexing or at least in the initial stage(s) of slurry complexing assists in decreasing the cooling costs compared to previously known procedures for ligand recovery based on selective complexation with sorbent particles. The process of this invention exhibits great flexibility with respect to sorbent particles size since recovery and ligand purity are not tied to maintenance of a certain particle size limitation and distribution therein. Usually, however, cuprous halide sorption-active sorbent particles are employed which are less than 200 microns in size in order to facilitate maintaining the slurry and pumping the slurry throughout the ligand recovery system.

These and other advantages of the present invention will be apparent from the description which follows:

The process of this invention can be conducted readily by passing the feed stream, either in gaseous or liquid form (but preferably in liquid form), in contact with a previously prepared slurry of said sorption-active cuprous halide sorbent particles having an average particle size of less than 200 microns, and a porosity above about 10% (of the volume of a particle) 550 to 10,000 A. pores in an essentially anhydrous organic liquid diluent containing $C_5^+$ monoolefin which has a boiling point higher than the boiling point of the complexable ligand and is less preferentially complexable with the sorbent than the ligand(s) being recovered. The term, less preferentially complexable, as used herein in reference to the $C_5^+$ monoolefins includes those which do not complex with the said cuprous halide sorbents. The complexation is conducted at liquid phase temperature and pressure condition, in order to form a solid cuprous halide-ligand complex which is insoluble in the slurry liquid diluent medium. If the feed which contains the complexable ligand also contains close boiling materials which are soluble in the slurry liquid diluent medium and which may or may not also complex with the sorbent particles but less preferentially than the ligand sought to be removed, then it is usually desirable to strip the less preferentially dissolved and/or sorbed material(s) from the complexed slurry of sorbent particles prior to desorption thereof (to remove the ligand which is preferentially complexed). The desorption then yields the product ligand in higher purity and concentration. Of course, in cases where one or more of the undesired feed components is insoluble in the inert diluent used, and no complexing of such feed component occurs at process conditions, considerably less or even no stripping still yields high purity product ligand.

According to the present ligand recovery process, a substantial portion, e.g., usually at least 25 wt. percent of the total amount of cuprous halide solid sorbent particles, is sorption-active. The term "sorption-active" as used herein is employed to denote cuprous halide sorbent particles which have a porosity of above about 10% (of the total volume of a particle) 550 to 10,000 A. pores, as determined by mercury porosimeter measurements. Preferably, at any given stage in the above-indicated ligand separation and recovery process, the concentration of sorption-active cuprous halide particles (at lined out conditions) ranged from about 50 to 99+% by wt. based on the total amount of solid cuprous halide particles in the slurry. The sorptive capacity of these sorption-active sorbent particles usually ranges from about 35 to 99+% and more preferably from 50 to 99+%, based on the theoretical capacity for sorption of the ligand being recovered. For example, if the ligand being recovered is 1,3-butadiene, the theoretical sorptive capacity will depend upon the stoichiometric ratio in which the 1,3-butadiene complexes with the cuprous halide. Thus, one mole of 1,3-butadiene complexes with 2 moles of cuprous chloride. The overall sorptive capacity of the total amount of solid cuprous halide sorbent particles present in the slurry can range from 20 to 95%, which is an average figure giving the overall or average sorptive capacity of the total amount of cuprous halide sorbent present in the slurry including material which is of high sorptive capacity and material having lesser sorptive capacity, e.g., material whose sorptive capacity has been diminished.

The sorption-active said cuprous halide sorbent particles can be prepared starting with fairly dry high purity, viz., 95+% pure commercial cuprous chloride, cuprous bromide, and cuprous iodide salt containing less than about 0.8% moisture. The preferred cuprous halide sorbents are cuprous chloride sorbents prepared from 99+% pure cuprous chloride salt which is substantially moisture-free viz., contains less than 0.5 wt. percent moisture (based on dry cuprous chloride).

The sorption-active porous sorbent particles can be prepared from raw cuprous halide salts by a straightforward two-stage procedure of complexing and decomplexing using a conditioning ligand capable of forming a >1:1 mole ratio stable complex with said cuprous halide, viz, wherein the complex has a mole ratio of copper to complexing ligand of greater than 1:1. The complexing operation imparts to the raw salt the requisite porosity upon decomplexing thereof. The desorption is usually conducted thermally by heating the previously complexed raw salt to thermally dissociate the complex therefrom, thus leaving the sorption-active cuprous halide sorbent particles. However, the sorption-active cuprous halide sorbent particles can be prepared in accordance with a wide variety of sorbent preparation procedures, e.g., as set forth in U.S. Ser. Nos. 333,925 and 333,926 filed on Dec. 27, 1963 both now abandoned. The disclosure of these cuprous halide sorbent preparation procedures is incorporated herein by reference. Basically, the procedures of Ser. Nos. 333,925 and 333,926 involve either dissolving the cuprous halide salts in a suitable solvent, or forming an aqueous or other slurry thereof followed by complexing the dissolved or slurry particles with a conditioning (complexing) ligand capable of forming a stable copper-ligand complex having a mole ratio of copper to complexing ligand of greater than 1:1.

If the copper-conditioning ligand complex is formed from a solution of the cuprous halide salt, the cuprous halide solution is usually prepared by dissolving the raw cuprous halide salt in $C_4$ to $C_{12}$ monoolefin solvent at temperatures ranging from about −40° F. to about 140° F. accompanied by stirring or other agitation to insure adequate dissolving of the salt in the solvent. Whether the sorption-active cuprous halide sorbent particles are prepared by the solution or slurry procedures of Ser. Nos. 333,925 or 333,926, or any other suitable method, it is preferable to employ conditioning ligands which form a stable complex having a mole ratio of copper to conditioning ligand of 2:1 or even higher. Such compounds include both material which form only complexes having said ratios of copper to complexing compounds greater than 1:1 and also compounds which form complexes having a ratio of 1:1 or less, which upon decomplexing pass through a stable complex having a ratio of copper to complexing compound greater than 1:1, and preferably of 2:1 and even higher as indicated above. Thus, certain materials, e.g., nitriles, diolefins, acetylenes, carbon monoxide, etc., under ordinary conditions forming a 2:1 complex can be made to complex in ratios of copper to complexing compound of 1:1 or less. However, upon dissociation, complexing material is released selectively from a bed of cuprous halide until the stable complex, viz., the complex having a copper to complexing ligand mole ratio above 1:1, e.g., 2:1 stoichiometric complex, is completely formed before further decomplexing to the uncomplexed (sorption-active) cuprous halide sorbent particles occurs. In this specification by "stable complex" is meant a stoichiometric complex stable upon dissociation as described in the preceding sentence. Such "conditioning ligands" which can be employed to prepare sorption-active cuprous halide sorbent particles which are used in accord with this invention include, but are not limited to, the following conditioning ligands: $C_3$ to $C_{10}$ conjugated and nonconjugated aliphatic, cyclic, and alicyclic polyolefins, e.g., butadiene-1,3, isoprene, piperylene, allene, octadiene, cyclohexadiene, cyclooctadiene, divinylbenzene, cyclododecatriene, $C_2$ to $C_{10}$ aliphatic and alicyclic acetylenes, or acetylenes containing additional unsaturation, e.g., acetylene, methylacetylene, propylacetylene, phenylacetylene, vinylacetylene, etc.; $C_2$ to $C_{10}$ and higher unsaturated or saturated aliphatic or alicyclic nitriles, e.g., acetonitrile, acrylonitrile, propionitrile, phenylnitrile, methacrylonitrile, ethacrylonitrile, etc.; carbon monoxide; HCN, etc. Of course, more than one of these functional groups can be present in a single molecule of the "conditioning ligand."

Usually the particle size of the sorption-active cuprous sorbent particles will be directly proportional to the particle size of the cuprous halide salt from which the active sorbent particles are prepared. As mentioned above, one of the benefits of the present invention is that there is no great necessity to maintain careful control over the particle size of the sorption-active sorbent particles during the slurry recovery procedure of the present invention. Usually, however, the slurry particles will have average particle sizes of less than about 200 microns with characteristically individual particles ranging in size from about 0.05 to about 400 microns. Preferably, the average particle size of the sorbent particles is less than about 100 microns with characteristically average individual particles ranging in size from about 0.1 to about 250 microns. In order to prepare a slurry containing the sorption-active particles within the above-mentioned size ranges, it is merely necessary to prepare them from the approximately equivalent size comparable raw cuprous halide salts using any suitable activation procedure such as those mentioned hereinabove in conjunction with Ser. Nos. 333,925 and 333,926.

The $C_5$+monoolefin-containing organic liquid diluent employed in the ligand recovery process of this invention can be any anhydrous organic liquid diluent with (1) has a boiling point above the boiling point of the complexable ligand recovered from the feed stream and (2) does not form a stable complex with the complexing agent at process conditions. Also, however, it is preferable to employ a diluent having a boiling point higher than any component in the feed stream. The specific organic liquid diluent or diluent system selected in a given case will, of course, depend upon the ligand being recovered and the components of the particular feed stream from which it is recovered. Bearing this in mind, usually the organic liquid diluent boils above 10° F., melts below 70° F., and has a low viscosity at operating temperatures, dissolves less than about 5%, preferably less than 1%, of either said sorption-active cuprous halide sorbent particles or the ligand complexes thereof, and can be separated readily from the product ligand in the final recovery procedure (as well as from any other feed components) preferably by simple distillation or flashing procedures.

While it is not a requirement of the organic liquid diluent that it be chemically inert to complexation with the cuprous halide sorbent particles, it is preferred that the organic liquid diluent be one essentially inert to complexation with the selected cuprous halide sorbent. In cases where the organic liquid diluent is complexable with the cuprous halide sorbent particles, it should always be one which is less preferentially complexable therewith than the ligand to be recovered from the feed stream.

As noted above, the composition of the organic liquid diluent can change during the process in cases where the $C_5^+$ monoolefin component is stripped after complexing and before decomplexing and then reintroduced upon recycle for further complexing. Suitable $C_5^+$ monoolefins are the $C_5$ to $C_{20}$ monoolefins and especially the alpha monoolefins. Examples of specific $C_5$ to $C_{20}$ monoolfins which can be employed include, but are not limited to, the following: pentene-1, hexene-1, heptene-1, 2,2,4-trimethylpentene-1, 2,2,4-trimethylpentane-2, octene-1, nonene-1, decene-1, undecene-1, 5-methyldecene-1, dodecene-1, etc.

The organic liquid diluent can consist essentially of $C_5^+$ monoolefin, viz., 100 wt. percent thereof (in which case no $C_5^+$ monoolefin stripping is conducted prior to desorption) or it contains other high boiling organic components which are preferably inert with respect to cuprous halide complexing. Such other components which can be included in the organic liquid diluent are $C_5$ to $C_{30}$ liquid paraffins and mixtures thereof, e.g., n-pentane, cyclopentane, cyclohexane, n-hexane, methylcyclohexane, n-heptane, isoheptane, n-octane, 2,2,5-trimethylpentane, n-nonane, n-decane, n-undecane, n-dodecane, n-hexadecanes, as well as isomers and mixtures thereof; $C_6$–$C_{18}$ aromatics and alkylated aromatics, esp. $C_6$ to $C_{12}$ monocyclic aromatics containing up to six substituents carbon atoms, e.g., benzene, toluene, xylenes, mesitylene, ethyl benzene, ethyl toluenes, cymene, cumene, etc., and mixtures of said $C_6$ to $C_{12}$ monocyclic aromatics; narrow boiling naphthas corresponding in carbon number content to the above mentioned $C_5$ to $C_{30}$ paraffins individually or in admixture; aromatics including those containing in excess of 12 carbon atoms such as bicyclic, tricyclic, and tetracyclic compounds, including, but not limited to: methyl naphthalenes and polymethyl anthracenes and phenanthrenes; and, of course, any less preferentially sorbed organic material having the physical properties specified herein, e.g., acetonitrile, allyl chloride, allyl bromide, etc. Usually, it is undesirable to employ an organic liquid diluent which is comprised in toto or a major portion of at least one component having a sufficiently low boiling point so that the boiling point of the organic liquid diluent at process conditions is lower than the temperature at which said cuprous halide sorbent particles are thermally deactivated due to annealing or other adverse thermal effects. Of course, if a diluent blend of two or more such components is employed, one component can have a boiling point lower than the thermal deactivation temperature of the sorbent particles whereas another component(s) has a boiling point higher than said sorbent deactivation temperature as long as the composite boiling point of the diluent at process conditions is below the sorbent deactivation temperature.

The use of inert liquid hydrocarbon diluents, especially $C_5$ to $C_{12}$ paraffins and $C_6$ to $C_{12}$ monocyclic aromatic hydrocarbons are preferred in accordance with this invention when the $C_5^+$ monoolefins is stripped before desorption. While the preferred organic liquid diluents in accordance with this invention are hydrocarbon diluents, this does not mean that organic diluents having a small amount or even significant halogenated substitution cannot be employed satisfactorily in accordance with this invention. Thus, the present invention includes within its broad purview the use of halogenated hydrocarbons as inert organic liquid diluents, as long as the halogenated hydrocarbons are essentially inert to reaction with the cuprous halide sorbent and the ligand being recovered from the feed stream and also the major additional component(s) present in the feed stream. Suitable halogenated organic diluents coming within this category include, but are not limited to, the following: carbon tetrachloride, ethyl chloride, ethyl bromide, ethylene dichloride, ethylene dibromide, propyl chloride, propyl bromide, butyl fluoride, butyl chloride, butyl bromide, amyl fluoride, amyl chloride, amyl bromide, etc., as well as mixed halides such as difluoro-dichloro methane, ethane, etc.

During complexing, the organic liquid diluent portion of the slurry can contain up to 90 wt. percent of these "other" component(s), viz., in addition to the $C_5^+$ monoolefin as will be noted from the below table:

ORGANIC LIQUID DILUENT DURING COMPLEXING

|  | Can use | Usually use | Prefer |
|---|---|---|---|
| Wt. percent $C_5^+$ Monoolefin | 5–100 | 10–90 | 20–75 |
| Wt. Percent Inert Organic Diluents "others" [1] | 95–0 | 10–90 | 25–80 |

[1] e.g., $C_5$ to $C_{20}$ paraffins, $C_6$ to $C_{12}$ monocyclic aromatics, etc.

During desorption, the organic liquid diluent portion of the slurry can contain from 0 to 100 wt. percent of $C_5^+$ monoolefins as noted hereinbelow:

ORGANIC LIQUID DILUENT DURING DESORPTION

|  | Can use | Usually use | Prefer |
|---|---|---|---|
| Wt. Percent $C_5^+$ Monoolefin | 0–100 | 0–50 | 0–50 |
| Wt. Percent Inert Organic Diluents "others" [1] | 0–100 | 50–100 | 50–100 |

[1] e.g., $C_5$ to $C_{20}$ paraffins, $C_6$ to $C_{12}$ monocyclic aromatics, etc.

The slurry contacted with the feed stream contains from 10 to about 65 wt. percent of the sorption-active cuprous halides solids, based on the total of slurry solids and liquids. The sorbent and organic liquid diluent should both be essentially anhydrous and definitely free from any bulk water. The feed stream should also be essentially water-free and should not contain more than about 300 parts per million water and preferably less than 100 parts per million water. The concentration of said organic liquid diluent in the slurry based on the total cuprous halide solids therein ranges from 40 to 900 wt. percent. In this regard, it should be noted that probably not all of the cuprous halide solids are equally active at all stages in the recovery process. It should also be remembered that the concentration of the sorption-active cuprous halides solids in the slurry medium after contact with the feed stream will be less than that present in the slurry composition prepared prior thereto because of the increase in weight of the total working slurry, viz., sorption active slurry plus feed stream, due to the weight of the feed stream. It should also be noted that the feed stream can be contacted with the slurried sorbent solids with feed stream in gaseous form, i.e., by bubbling the feed stream into the slurry of sorption-active cuprous halide particles and organic liquid diluent. As long as the slurry complexing is conducted in the liquid phase, the feed stream can be passed into contact with the slurry in either gaseous or liquid form.

The liquid phase slurry complexing can be carried out in one or a series of steps at any temperature and pressure conditions which yield liquid phase complexation. Of course, the specific complexing temperatures and pressures employed during the slurry liquid phase complexation will depend mainly upon the specific ligand being recovered and the specific feed stream in which the ligand is present. Another factor governing the temperature of the liquid phase complexation is that even when a ligand being recovered has a very high boiling point as well as the feed stream in which it is present, and despite the fact that the inert organic liquid diluent has an equal or higher boiling point, the complexing and decomplexing operations should not be conducted at temperatures exceeding the thermal deactivation temperature of the sorbent particles. With these parameters in mind, complexing is usually conducted at temperatures ranging from −80 to 180° F. and comparable pressures of 0 to 500 p.s.i.g. According to a preferred embodiment of this invention, and especially when it is desired to recover multiolefins such as conjugated diolefins, e.g., butadiene, the complexing is conducted in a series of slurry contacting steps wherein each succeeding liquid phase slurry complexing step is conducted at a lower temperature than the one preceding it, with all said steps being conducted in the presence of the organic liquid diluent. For example, when recovering butadiene from a $C_4$ hydrocarbon feed stream containing about 30 to 40 wt. percent butadiene, 58 to 68 wt. percent butenes, 2 wt. percent butanes, very satisfactory recovery of butadiene-1,3 is secured using 3 complexing stages, each conducted in the presence of a $C_5^+$ monoolefin, e.g., pentene-1 in each complexing stage, wherein the first complexing stage is conducted at temperatures of 0 to 150° F. using comparable pressures of 5 to 100 p.s.i.a., the second slurry complexing stage is conducted at temperatures of 0 to 110° F. and pressures of 5 to 70 p.s.i.a., and the third or clean-up complexing stage is conducted at temperatures of −20 to 70° F. and pressures of 1 to 30 p.s.i.a.

While it is not necessary to conduct stripping operations when the feed stream initially contains high concentrations of the ligands to be recovered, it is usually desirable to employ stripping when the feed stream contains a ligand in low concentrations and especially where the feed stream contains an additional component(s) having a boiling point(s) close to that of the primary ligand to be recovered.

The stripping can be accomplished by heating the complexed slurry at temperatures which are at or below, and preferably from 150 to 5° F. below, the decomplexing (desorption) temperatures to be employed in subsequent decomplexing step. Any organic liquid diluent lost during stripping can be recovered by splitting the diluent from the stripping gas at appropriate conditions of temperature and pressure. According to one embodiment of the present invention, the stripping can be performed using a material which in itself is complexable with cuprous halide sorbent particles. Stripping can also be conducted by washing the stripping column countercurrently with any suitable liquid or gaseous stripping material which can include a ligand complexable with the cuprous halide sorbent particles as long as the stripping is conducted at temperatures and pressures which do not cause significant decomplexation of the previously complexed desired ligand to be recovered from the feed stream. Thus, for example, when the desired ligand to be recovered present in the feed stream is butadiene-1,3, the stripping operation to remove any butenes present also in the feed stream can be conducted using relatively pure butadiene-1,3. The stripping can also be conducted by countercurrent liquid washing or gaseous stripping using inert liquid hydrocarbon, esp., inert $C_5$ to $C_{12}$ paraffins. Also, any combination of the above can be employed, such as countercurrent stripping with mixtures of the butadiene and $C_5$ to $C_{12}$ paraffin, in liquid or gas phase.

It may also be advisable to carry out a partial decomplexing operation to remove preferentially undesirable ligands complexed from the feed stream. This decomplexing operation is carried out under such conditions that vary little, if any, of the desirable complex is decomposed while the bulk of the undesired constituent's complex (less preferentially sorbed) is broken down, allowing removal of the undesired constituent by stripping in any of the above-mentioned monomers. This partial decomplexing is achieved by heating to less severe conditions than the total decomplexing described below. Of course, as noted hereinabove, the $C_5^+$ monoolefin component of the organic liquid diluent can be stripped from the complexed slurry prior to desorption thereof. This stripping can be accomplished contemporaneously with the stripping of feed close boilers, e.g., butenes in a $C_4$ butadiene-containing feedstream. Since the $C_5^+$ monoolefin diluent component of the organic liquid diluent is not present in the feed, it can be referred to as an extraneous monoolefin.

The complexed (and optionally stripped) cuprous halide slurry solids are then subjected to decomplexation (desorption) to desorb and recover the previously sorbed ligand therefrom. Decomplexing can be accomplished at any suitable temperatures and pressures as long as they do not thermally deactivate (severely anneal) the cuprous halide sorbent particles. Of course, the decomplexing must also be conducted at temperatures and pressure conditions wherein the organic liquid diluent remains in the liquid state. In this regard, it should be clearly understood that the organic liquid diluent remains in the liquid state throughout the entire process, viz., during complexing, stripping, decomplexing and splitting operations.

Preferably, the decomplexing is conducted as rapidly as reasonably possible to minimize the residence time of the cuprous halide sorbent solids at high temperatures. The desorbed sorbent is now in a condition of sorption activity again and can be recycled for further use as a working slurry to recover more complexable ligand from feed stream containing it. As noted from the discussion heretofore, usually the cuprous halide sorbent particles will need no regeneration prior to recycling for further use, and when regeneration is employed, it is at very infrequent intervals. In this regard, satisfactory performance is achieved in butadiene recovery operations using sorption-active cuprous chloride slurry in a mixed diluent composed of $C_5$ to $C_{12}$ paraffins and $C_5$ to $C_{12}$ monoolefins, which slurries are worked continuously for in excess of 800 hours on $C_4$ hydrocarbon streams containing approximately 30 wt. percent butadiene, 68 wt. percent butenes, and 2 wt. percent butanes.

Usually it will be desirable to regenerate the previously active cuprous halide sorbents when, after extended usage, the sorptive activity and capacity of the ligand falls below about 50 percent of its initial activity or if the purity of the product ligand recovered falls below the desired level. Regeneration of the sorbent particles can be conducted by contacting them (complexing) with a suitable conditioning ligand such as any of those mentioned hereinabove, followed by decomplexation thereof to release the sorption-active material.

The ligands capable of being recovered from feed streams in accordance with this invention include a wide variety of materials. Suitable recoverable ligands capable of forming a solid stable complex with said cuprous halide sorbents having a mole ratio of copper to complexing ligand of greater than 1:1 include, but are not limited to, the following: any and all of the previously mentioned ligands suitable as "conditioning ligands" for preparing the highly porous, sorption-active cuprous halide sorbent particles from their corresponding raw salts; halogenated conjugated or nonconjugated aliphatic, cyclic, and alicyclic polyolefins, e.g., 2 - chloro - 1,3 - butadiene, chloro and bromo piperylenes, chlorocyclohexadiene; unsaturated ethers such as divinyl ether; acetylenic halides, alcohols, acids, and esters such as propargyl chloride, propargyl bromide, propargyl alcohol, propargyl acetate, propargyl acid, etc.; various nitrile substituted acids, ethers, esters such as 2-hydroxy propionitrile, substituted butyronitriles, etc.

The present invention will be understood in great detail by the examples which follow. These examples are included herein to illustrate rather than limit the present invention.

EXAMPLE 1

Preparation of sorption-active cuprous chloride

Sorption-active cuprous chloride solids are prepared typically in the following manner. Commercial 95% pure cuprous chloride was dissolved in concentrated hydrochloric acid until the solution was saturated. One volume of the saturated solution was then slowly added to four volumes of water through which 1,3-butadiene was being continuously bubbled to keep the water saturated with butadiene. The yellow butadiene-cuprous chloride complex precipitated, was filtered off, washed with isopropanol and anhydrous ether, and then dried in flowing nitrogen and stored as the complex. When the active cuprous chloride solids were needed, the complex was heated to 100° C. for about 15 minutes in a fluid bed using $N_2$ as the fluidizing gas. The thus prepared highly porous sorption-active cuprous chloride sorbent particles were then slurried in various $C_5^+$ monoolefin-containing organic liquid diluents and used to recover various ligands as noted from the below examples.

EXAMPLE 2

Increased complexation rate with $C_5^+$ monoolefin present in organic liquid diluent slurry of porous cuprous chloride sorbent particles This example shows that increased complexation rates (decreased time to achieve the desired degree of complexation) are obtained when all or a portion of the slurry diluent stream is $C_5^+$ monoolefinic.

These tests were conducted as follows. A one-liter stirred autoclave was equipped with a temperature control system, an accurate temperature recorder, and a device to introduce sorption-active cuprous chloride sorbent below the level of the liquid in the vessel. In a typical complexing test, about 180 g. of the diluent under study was placed in the vessel along with about 120 g. of an unsaturated $C_4$ hydrocarbon stream which comprised about 35% 1,3-butadiene and 65% mixed butenes. About 25 g. of a sorption-active cuprous chloride sorbent was placed in the device under the liquid level. The liquid was agitated and brought to the desired complexation temperature. The sorbent was then released into the liquid and the rise in temperature, caused by heat of complexation, was recorded as a function of time. In each case, the sorbent complexed to about the same level. Tabulated below are the complexation times for a series of tests wherein the $C_5$ diluent was varied from pure n-pentane to pure 1-pentene. The data clearly show that replacing all, or part, of the paraffin diluent with monoolefin gives shorter complexation times, an allows the use of proportionately smaller complexation vessels in a commercial slurry process.

LABORATORY COMPLEXATION TEST, 60° F.

| Wt. percent 1-pentane in $C_5$ Organic Liquid Diluent | Wt. percent n-pentane in $C_5$ Organic Liquid Diluent | Complexation Time, seconds |
|---|---|---|
| 0 | 100 | 40 |
| 25 | 75 | 33 |
| 50 | 50 | 25 |
| 100 | 0 | 19 |

A similar test was carried out in which the slurry diluent comprised $C_7$ hydrocarbons and the ligand recovered was 1,3-butadiene. These data are shown below.

LABORATORY COMPLEXATION TEST, 71° F.

| Wt. percent 1-heptane in $C_7$ Organic Liquid Diluent | Wt. percent in n-heptane in $C_7$ Organic Liquid Diluent | Complexation Time, seconds |
|---|---|---|
| 0 | 100 | 30 |
| 50 | 50 | 20 |

Similar studies concerning decomplexing rates establish faster decomplexing when heptene is present during desorption than when pure heptane is used.

EXAMPLE 3

Accelerationg effect of $C_5^+$ monoolefins on desorption

In this example, the accelerating effect of monoolefins on decomplexation rate of the complexed cuprous chloride sorbent is shown. These tests were conducted as follows.

The laboratory decomplexation test unit consists of a small vessel which contains approximately 1 g. of complexed sorption-active cuprous chloride sorbent previously complexed with 1,3-butadiene. This vessel is connected to a large reservoir of slurry diluent which is pumped continuously over the slurry of complexed solids in the smaller vessel during the test. The equipment and diluent are heated to the desired decomplexation temperature, and the diluent is then pumped over the slurry. Samples of the sorbent are taken at various time intervals, and the percent complexation remaining on the sorbent is measured. The rate of decomplexation is given as the percent of complexation which is lost per minute when at the desired temperature. The results tabulated below show the pronounced acceleration of decomplexation when a portion of the slurry diluent is a monoolefin.

LABORATORY DECOMPLEXATION TEST, 150° F.

| Wt. percent 1-pentane in $C_5$ Organic Liquid Diluent | Wt. percent n-pentane in $C_5$ Organic Liquid Diluent | Percent Decomplexation Minute |
|---|---|---|
| 0 | 100 | 18 |
| 25 | 75 | >56 |

EXAMPLE 4

No loss in recovered ligand product purity results from incorporating $C_5^+$ monoolefin as part or all of organic liquid slurry diluent This example shows that no loss in the high purity quality of the 1,3-butadiene product from the slurry process occurs when all or part of the diluent comprises a $C_5^+$ monoolefin.

These tests were carried out as follows. In a one-liter autoclave was placed 300 g. of the diluent in question, and 150 g. of decomplexed sorption-active sorbent. The vessel was heated to 90° F. and 100 g. of a $C_4$ unsaturated hydrocarbon stream (comprising approximately 35% 1,3-butadiene and 65% mixed butenes) was added. When complexation was complete, the complexed solids were decomplexed in a stream of nitrogen at 150-170° F. The 1,3-butadiene product which was complexed on the sorbent was collected as it was decomplexed, and was analyzed by gas chromatography. The results tabulated below show that no appreciable loss in product purity results from use of a $C_5^+$ monoolefin as all or part of the slurry diluent during complexation.

LABORATORY PURITY TESTS
[90° F. Complexation 150-170° F. Decomplexation 1,100 p.p.m. Vinyl Acetylene in Feed]

| Diluent | 100% n-Pentane | 50:50 n-Pentane: 1-pentene | 100% 1-pentene |
|---|---|---|---|
| Product Purity: | | | |
| 1,3 butadiene, Wt. percent | 99.9 | 99.9 | 99.9 |
| Vinyl Acetylene, p.p.m. | 22 | 30 | |

EXAMPLE 5

Acrylonitrile recovery from an acrylonitrile-containing feed stream by contact with a decene-1 slurry of porous, active cuprous chloride solids A 50 wt. percent slurry of porous sorption-active cuprous chloride in decene-1 is prepared and maintained in a stirred autoclave at 80° F. A stream of nitrogen containing 7% acrylonitrile and 0.7% acetonitrile was prepared to simulate the product from an acrylonitrile plant using oxidation of propylene in the presence of ammonia as the manufacturing process. This synthetic feed is bubbled through the slurry at 80° F. and 1 atmosphere pressure and the acrylonitrile is selectively complexed with the cuprous chloride to give an 85% recovery from the feed stream. After breakthrough of the feed composition, the slurry is stripped at 80° F. and atmospheric pressure for 1 hour with a stream of nitrogen containing 7% of pure acrylonitrile to remove dissolved unreacted feed from the slurry liquid. Decomplexing is carried out at 212° F. using $N_2$ as a stripping gas and the product acrylonitrile is condensed out in a dry ice trap. Analysis by gas chromatography reveals no acetonitrile in the product acrylonitrile.

EXAMPLE 6

Acetylene recovery from an acetylene-containing feed stream using pentene-1 as organic liquid diluent and active cuprous chloride solids A 50 wt. percent slurry sorption-active cuprous chloride in pentene-1 is prepared and placed in an autoclave and held at 0° F. A synthetic feed of 20% acetylene, 40% ethylene, and 40% ethane was passed through the slurry at 0 p.s.i.g. The acetylene content of the exit gas is 2% to give an acetylene recovery of 91% of that in the feed. After breakthrough of the feed composition, the slurry is stripped with pure acetylene at 0° F. and atmospheric pressure to remove dissolved ethane and ethylene from the slurry. The slurry is then decomplexed to recover essentially pure acetylene at 1 atmosphere and 125° F. The acetylene loading of the solid complex is approximately 40%.

EXAMPLE 7

Recovery of isoprene from a steam cracked isoprene-containing feed stream using a $C_8$ monoolefin refinery mixture extraneous slurry diluent composed of approximately 50 wt. percent of 2,2,4-trimethylpentene-1 and 50 wt. percent of 2,2,4-trimethylpentene-2

A 50 wt. percent slurry of sorption-active cuprous chloride in said $C_8$ monoolefin mixture is prepared and placed in a stirred autoclave at 32° F. A crude isoprene concentrate containing about 40% isoprene, 3.6% piperylenes, and about 56% pentenes is obtained from a commercial isoprene plant, vaporized into a nitrogen carrier gas and passed through the slurry at atmospheric pressure. The crude isoprene concentrate is about 25 vol. percent of the gas stream. From the analysis of the exhaust gas, about 90% of the isoprene is recovered from the feed. After the feed composition breaks through the slurry, the autoclave is heated to 80° F. and the slurry is stripped with a stream of 25 vol. percent isoprene in nitrogen to remove unreacted feed. Finally, the slurry is decomplexed at 140° F. in a stream of flowing nitrogen. The product contains 93% pure isoprene with the major impurity being 6% trans-piperylene. The isoprene loading of the solid complex is about 45% of theoretical.

EXAMPLE 8

Allene from an allene-containing $C_3$ feed stream using hexene-1 as organic liquid diluent and active cuprous chloride solids A 50 wt. percent slurry of sorption-active cuprous chloride in hexene-1 is prepared and placed in an autoclave held at −20° F. An allene-containing feed of the following composition is passed through the slurry at 10 p.s.i.g. back pressure.

Allene feed (components): | Vol. percent
---|---
Allene | 10
Propane | 70
Propylene | 20

The tail gas contains about 0.5% allene to give an allene recovery of 95.5%. After feed composition breakthrough, the slurry is stripped with pure allene at 80° F. and 10 p.s.i.g. to remove unreacted feed and final decomplexing is conducted at 170° F. and atmospheric pressure. The product allene is 99.3% pure and the loading of the solid is 55% of theoretical.

EXAMPLE 9

Recovery of methacrylonitrile from an appropriate feed stream using dodecene-1 as organic liquid diluent and active cuprous chloride solids A slurry of 50 wt. percent sorption-active cuprous chloride in dodecene-1 is prepared and placed in a stirred reactor held at 100° F. A feed stream simulating product of a methacrylonitrile plant is prepared with the following composition:

Methacrylonitrile feed (components): | Mole percent
---|---
Isobutylene | 90
Methacrylonitrile | 9
Acrylonitrile | 0.5
Acetonitrile | 0.5

This feed gas is then passed through the slurry at atmospheric pressure to obtain a 70% recovery of methacrylonitrile. After feed breakthrough, the slurry is allowed to settle, the dodecene-1 liquid is decanted and replaced with a fresh charge of dodecene-1, the slurry is re-suspended with stirring, allowed to settle and diluent decanted a second time, and finally re-suspended in a fresh charge of dodecene-1 diluent. Then the methacrylonitrile is decomplexed by heating to 100° C. with a purge stream of nitrogen, from which the methacrylonitrile is condensed by cooling. The recovered methacrylonitrile contained only traces of acrylonitrile or acetonitrile and amounts to a loading of about 40% of theoretical in the solids.

While the foregoing examples illustrate the present invention in great detail, it should be realized that the present invention is not limited to the specific details contained therein as other $C_5^+$ monoolefins can be used, other ligands can be recovered, etc., including those noted in that portion of the disclosure preceding the examples.

What is claimed is:

1. A process for recovering a complexable ligand of enhanced purity from an essentially anhydrous feed containing it in lower purity wherein said ligand is capable of forming a stable complex with said cuprous halide having a mol ratio of copper to complexing ligand greater than 1:1 with a cuprous halide which comprises:

(A) contacting said feed with an essentially anhydrous slurry of (1) solid sorption-active cuprous halide sorbent particles selected from the group consisting of cuprous chloride, cuprous bromide and cuprous iodide and having a porosity above about 10% (of the volume of a particle) 550 to 10,000 A. pores in (2) an essentially anhydrous organic liquid diluent having a boiling point above the boiling point of said complexable ligand and containing a $C_5^+$ monoolefin which is less preferentially complexable than said ligand being recovered, at temperature and pressure conditions sufficient to effect liquid phase formation of a solid said cuprous halide-ligand complex, and (B) desorbing said solid complex in the presence of organic liquid diluent to recover said ligand.

2. A process as in claim 1 wherein said diluent contains at least 10 wt. percent of said $C_5^+$ monoolefin during said contacting (A).

3. A process as in claim 1 wherein said ligand forms a stable complex with said cuprous halide having a mole ratio of copper to complexing ligand of at least 2:1.

4. A process as in claim 1 wherein said cuprous halide is cuprous chloride.

5. A process as in claim 1 wherein said liquid phase slurry complexing is conducted in a plurality of sequential liquid phase slurry complexing steps, each succeeding liquid phase slurry complexing step being conducted at a lower temperature than the preceding one with all said steps being conducted in the presence of said organic liquid diluent containing said $C_5^+$ monoolefin.

6. A process as in claim 1 wherein said organic liquid diluent has a boiling point lower than the temperature at which said cuprous halide sorbent deactivates.

7. A process as in claim 1 wherein the concentration of said organic liquid diluent in said slurry ranges from 40 to 900 wt. percent, based on total cuprous halide solids.

8. A process as in claim 1 wherein said slurry contains from 10 to about 70 wt. percent of said sorption-active cuprous halide solids, based on the total of slurry solids and liquids.

9. A process as in claim 8 wherein the average particle size of said cuprous halide sorbent particles is $<200\mu$.

10. A process as in claim 1 wherein said ligand is a $C_3$ to $C_{10}$ multiolefin.

11. A process as in claim 1 wherein said ligand is a $C_2$ to $C_{10}$ nitrile.

12. A process as in claim 10 wherein said multiolefin ligand is 1,3-butadiene.

13. A process as in claim 11 wherein said nitrile is acrylonitrile.

14. A process as in claim 1 wherein the desorbed slurry from (B) comprised of said sorption-active cuprous halide sorbent solids and organic liquid diluent are recycled to said liquid phase complexing (A).

15. A process as in claim 1 wherein said organic liquid diluent comprises a $C_5^+$ monoolefin present in a concentration of from 10 to 90 wt. percent and a $C_5^+$ paraffin, and the $C_5^+$ monoolefin compound thereof is stripped from the remainder of the organic ligand diluent after contacting (A) but prior to decomplexing (B).

16. A process as in claim 15 which includes reintroducing previously stripped $C_5^+$ monoolefin to said desorbed slurry containing said desorbed cuprous halide solids and said paraffin containing organic liquid diluent and then recycling the $C_5^+$ monoolefin-containing slurry to said liquid phase complexing (A).

References Cited

UNITED STATES PATENTS

| | | | |
|---|---|---|---|
| 3,268,614 | 8/1966 | Long | 260—681.5 |
| 3,348,908 | 10/1967 | Long et al. | 23—97 |
| 3,403,196 | 9/1968 | Long et al. | 260—677 |
| 3,409,692 | 11/1968 | Long et al. | 260—677 |
| 3,410,924 | 11/1968 | Fasce | 260—677 |
| 3,411,871 | 11/1968 | Bauch et al. | 23—97 |

DELBERT E. GANTZ, Primary Examiner

G. E. SCHMITKONS, Assistant Examiner

U.S. Cl. X.R.

23—97, 204; 260—669, 674, 677, 679, 681.5